Oct. 17, 1944.   L. F. HAMMAND   2,360,338
WHISTLING NOZZLE
Filed Nov. 27, 1941
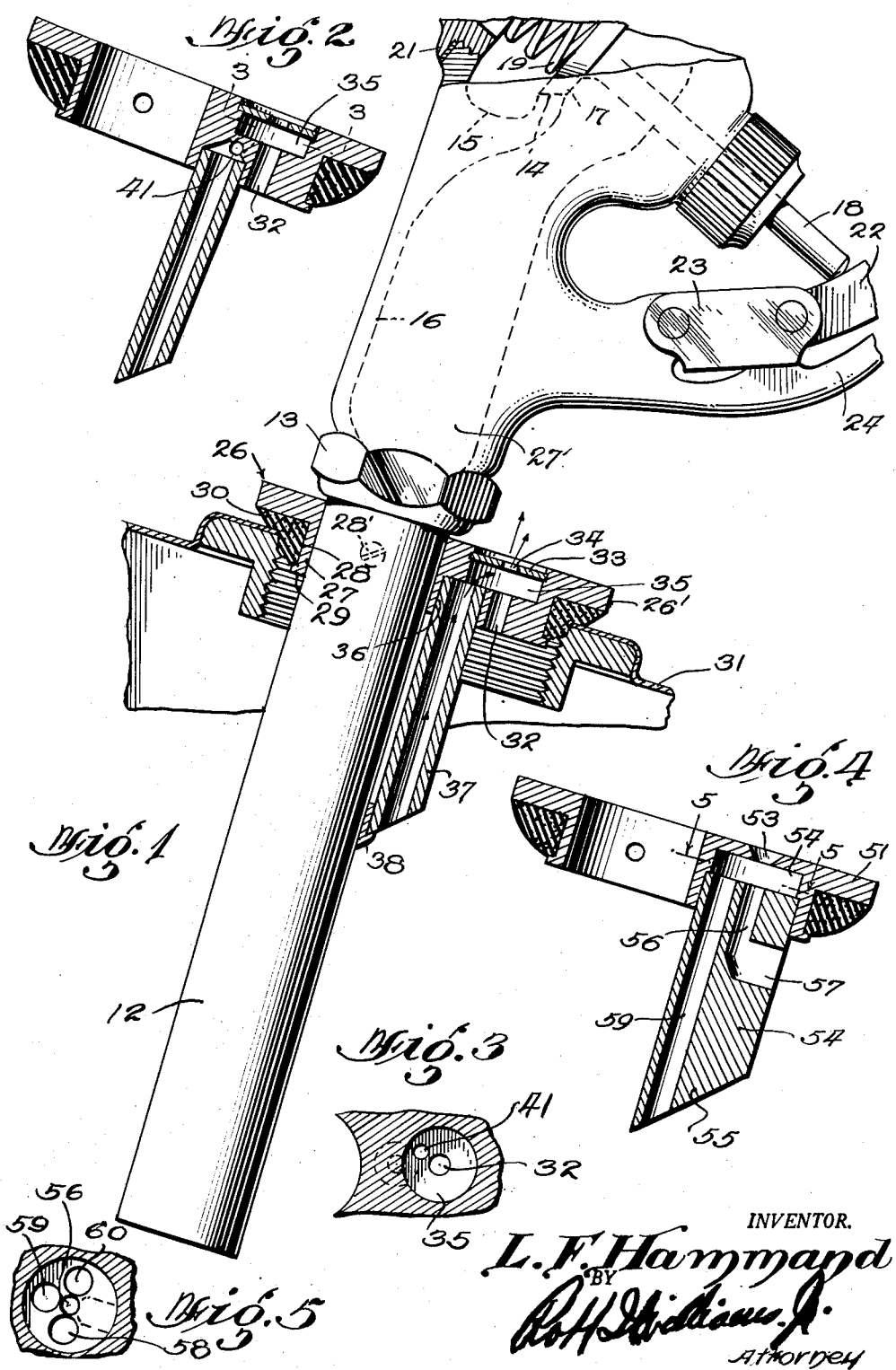
INVENTOR.
L. F. Hammand
BY
[signature]
ATTORNEY Patented Oct. 17, 1944

2,360,338

UNITED STATES PATENT OFFICE 2,360,338

WHISTLING NOZZLE

Lowell F. Hammand, Washington, D. C.

Application November 27, 1941, Serial No. 420,674

1 Claim. (Cl. 116—109)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to gasoline dispensing equipment and more particularly to a novel and improved form of signalling device arranged to emit an audible signal as the level of the liquid in the container being filled approaches the top of the container.

One of the principal objects of this invention is to provide a signalling nozzle including a whistle structure so arranged and constructed that the whistle remains inaudible throughout the period of time in which the container is being filled and emits a signal only when the level of liquid in the container reaches a predetermined level.

A further object of the invention is to provide an improved audible signal indicator of such design and construction as to be operative within wide limits of rate of flow and pressure, in order to be equally well adapted for use with fuel under pressure or gravity feed.

A further object of the invention is the provision of an improved signal whistle structure of simple and rugged construction, having no moving parts and capable of withstanding great physical abuse.

A further object of the invention is the provision of a nozzle signalling device including a whistle having a cylindrical whistle chamber with a central axial inlet and discharge port, together with means for rendering the whistle inoperative until the level of the liquid in the container being filled reaches a predetermined level.

Before describing the detailed structure illustrated in the drawing, it is believed pertinent to point out that the present structure has been developed primarily to meet present military requirements in which it has been found desirable to provide gasoline dispensing nozzles so arranged as to give an audible signal when the level of liquid in the container being filled reaches a predetermined level, so that the operator may manually close the fuel valve before the container being filled overflows.

Before going into an explanation of the details of the structure of the device illustrated in the drawing, it is believed to be pertinent to point out that in modern military operations the use of large stationary or movable gasoline tanks in combat operations is frowned on for the reason that any large container becomes an obvious target for enemy aircraft attack or artillery bombardment. It is the present preferred military practice to refuel tanks, aircraft or other combat vehicles from relatively small metal containers shipped into the battle zone by truckloads, and of such size and shape that they may be easily concealed in locations spaced apart from each other so that they will not present such a vulnerable target to the enemy. These individual containers are filled from larger tanks or tank cars back of the zone of combat and after being emptied in the refueling operations in the field are returned behind lines for subsequent refilling.

In view of the tremendous quantities of gasoline utilized in modern military operations and the obvious dangers incident to the spilling of inflammable fuel near the storage tanks, it will be apparent that some means must be provided for filling such small containers so that large numbers of them may be quickly filled to the desired level without danger of overflowing. It should not be overlooked, however, that the rough treatment and abuse that military equipment of this character necessarily receives prevents the use of any structure except the most rugged and simple available. Also, since operations of the character described are preferably carried out in absolute darkness, ordinary visual types of indicating devices are entirely impractical.

Referring now more particularly to the drawing,

Fig. 1 is a sectional view, partly in elevation, of an improved signalling device constructed in accordance with the teachings of this disclosure, the device being shown attached to the conventional form of gasoline dispensing nozzle.

Fig. 2 is a sectional view of a modified form of the signalling device illustrated in Fig. 1.

Fig. 3 is a detail sectional view of the whistle structure illustrated in Fig. 2 and is taken substantially on the plane of the line 3—3 in Fig. 2.

Fig. 4 is a central sectional view of a second modified form of the device.

Fig. 5 is a detail sectional view taken substantially on the plane of the line 5—5 of Fig. 4.

In order that the signal indicator device may be utilized in connection with standard gasoline dispensing equipment of conventional design and proven merit, and to avoid any necessity of special tooling or the construction of any complicated type of apparatus, the signal indicator device is designed and constructed so that it may be applied to a conventional dispensing nozzle, either permanently or temporarily, and without requiring any substantial changes in design of the nozzle structure. In the present invention, the signalling devices are provided in a separate nozzle conversion unit so arranged and constructed that it may be instantly applied to any of the standard forms of nozzles now adapted for use in the Army, and when so attached will convert the standard type of dispensing nozzle into an audible signal indicating nozzle whereby the operator will be warned that the liquid level in the vessel being filled has reached a predetermined level so that he may manually shut off the fuel flow in time to prevent overflow.

In the drawing, the numeral 11 indicates a gasoline dispensing valve body, which is provided with a spout 12 secured to the body 11 by the threaded nut 13. The valve body 11 also includes a valve seat 14 arranged to separate the inlet passageway 15 from the discharge passageway 16. The valve seat 14 is normally closed by a valve 17 at the upper end of the valve stem 18 and normally urged downwardly into engagement with the valve seat 14 by a compression spring 19 carried by the closure cap 21 in the conventional manner.

An operating handle 22 and link 23 are pivotally mounted at the forward end of the handle guard 24 so that the operator may grasp the handle 22 to force the valve stem 18 inwardly and lift the valve 17 from the seat 14 against the action of the compression spring 19 to open the valve and permit the liquid to flow from the inlet passageway 15 through the discharge passageway 16 and outwardly through the lower end of the spout 12.

The structures thus far described are entirely conventional and well-known in the art, and since they do not form a pertinent part of this invention except in connection with the structure to be hereinafter described, they will not be mentioned in greater detail in this application.

The audible signal conversion unit consists of a stopper body 26 drilled with a large cylindrical opening 27 through which the spout 12 of the nozzle extends. A setscrew 28' is threaded into the stopper body to secure the stopper in position on the spout. The stopper body 26 is preferably formed of metal and is arranged to include an annular flange 26' and a neck portion 28 terminating in a small lip 29 arranged to maintain a resilient gasket 30 in position on the neck. The resilient gasket 30 is preferably provided with an angularly inclined sealing surface of size and shape to firmly engage the inner walls of the mouth of a sheet metal fuel container 31. As illustrated, the container 31 constitutes a standardized type of five-gallon fuel container from which Army vehicles are customarily refueled in the field.

The stopper body 26 is drilled with a relatively small passageway 32 extending parallel to and spaced apart from the bore 27 provided to receive the spout portion 12 of the dispensing nozzle. This passageway 32 is counterbored at its upper end to provide a greatly increased diameter adjacent the upper end of the bore, and a closure plug or washer 33 is soldered or otherwise secured in the counterbore section of the opening at a point closely adjacent the upper surface of the stopper body. The washer 33 includes a central orifice 34 in axial alignment with the lower passageway 32 anad is spaced upwardly above the lower surface of the counterbore portion, to provide a cylindrical whistle chamber 35 entirely surrounding the passageway which serves as the inlet port. The passage 34 through the washer 33 serves as the outlet port.

The stopper body 26 is also drilled from the bottom to provide an opening 36 into which an auxiliary air inlet tube 37 is pressed, and it will be seen from an examination of the drawing that the relationship of parts is such that the upper end of the air inlet tube interconnects with the cylindrical chamber 35 and the lower end of the tube is in communication with the interior of the container being filled. The lower end of the air inlet tube is beveled at an angle of about 45 degrees to facilitate entry of the nozzle into the mouth of a container and, if desired, the tube may be welded to the nozzle spout at the point 38.

In operation, the spout of the dispensing nozzle is inserted into the container being filled and the resilient gasket 30 of the stopper body 26 is pressed into engagement with the mouth of the container 31 to establish a substantial seal, so that as gasoline is admitted to the container through the spout, the air within the container will be vented through the whistle passageways in the stopper body. The arrangement is such that as the container is being filled the whistle will vent the air without emitting an audible sound, but as the liquid level in the container reaches a predetermined level it will close the lower end of the air inlet tube 37 and the whistle will then emit a shrill signal, so that the operator may manually close the valve structure of the dispensing nozzle before the container is completely filled.

As heretofore pointed out, the whistle structure consists of an annular chamber provided with an axial central inlet port and an outlet port in exact axial alignment therewith. The inherent characteristics of a whistle of this type are such that it will operate only if energized by a single jet of air flowing upwardly through the inlet port 32. While the container is being filled, however, and before the liquid level reaches the lower extremity of the air inlet tube 37, the air within the container will flow into the chamber 35 from two sources, namely, through the auxiliary air inlet 37 and through the inlet port 32. This will result in an interference of the jets of air entering the chamber 35, with the result that, although the air may leave the container through the outlet port 34, the whistle will be inoperative and will emit no audible signal.

When the lower end of the tube 37 is closed by the rising level of the liquid, however, this stream of air will be interrupted and all air emitted from the interior of the container thereafter will be directed in a single jet through the port 32. When this occurs, the whistle will emit a signal and the operator may manually close the nozzle valve.

In the modified form of the invention disclosed in Figs. 2 and 3, the operation and structure are identical with the single exception that the air inlet tube is interconnected with the annular whistle chamber by a diagonal passageway 41. This passageway is inclined inwardly at an angle with respect to the inlet port 32, as illustrated by Fig. 2, and is also positioned in a somewhat tangential relationship with the annular chamber so that as the air from the tube enters the chamber it will set up a whirling current of air within the chamber and effectively prevent the operation of the whistle. It is to be understood, of course, that while the passage has been shown as inclined both axially and tangentially, beneficial results may be accomplished by either arrangement without the other.

In the structure illustrated in Figs. 4 and 5, the stopper body 51 is drilled from the lower side to provide the annular chamber 52 and the outlet port 53 is countersunk to provide an outward flare or taper at the upper surface of the stopper body 51. The lower surface of the bore 52 is plugged with a cylindrical metal rod 54 which is beveled at its lower end 55 and which may be attached to the spout of the dispensing nozzle by welding in the same manner as the air inlet tube 37 hereinbefore described. The rod 54 is provided with a central axial orifice 56, which is open to the entry of air from the interior of the container by the side port 57. A plurality of auxiliary air inlet ports 58, 59 and 60 are drilled through the length of the rod 54 and are open to the interior of the container at points substantially below the port 57.

In operation, the function of the device illustrated in Figs. 4 and 5 is identical with that hereinbefore described, with the single exception that the air may enter the whistle chamber through any one of the several ports 58, 59 and 60, as well as the central inlet passage 56, so that a comparatively large volume of air will flow through the three inlet passages and will prevent any possibility of whistling sounds being emitted by virtue of the air jet passing through the central passage 56. The operation will otherwise be the same, however, since whenever the liquid level within the container rises to cover the lower end of the rod 54 all of the air inlets 58, 59 and 60 will be closed and the air will thereafter be emitted only through the single central whistle passageway 56, so that a warning signal will be sounded.

From the foregoing, it will be apparent that by practicing the teachings of the present invention it is possible to provide a highly satisfactory signal indicating nozzle of extremely simple construction capable of entirely satisfactory operation even under the most adverse circumstances of use. It will be noted, of course, that the entire nozzle structure may be of conventional design and construction and the indicating features included by the simple addition of a few comparatively inexpensive parts. In military operations, the indicator here disclosed is of particularly desirable construction since it has no moving parts whatsoever and can be subjected to great abuse without damage. In this connection, it will be noted that the entire stopper body and particularly the whistle structure is quite well protected against accidental damage, since it lies closely adjacent the threaded nut 13 of the nozzle and is close to the nozzle handle guard 24 so that a line drawn between the lower extremity of the nozzle 12 and the guard 24 will not intercept any portion of the stopper body construction. This, of course, means that the stopper is not apt to be damaged by being dropped on the ground or even against steel or concrete surfaces, since the force of any accidental impact will be more apt to be delivered to the nozzle 12 or the guard 24.

Further, the conventional type of nozzle may be altered to provide a warning signal without making any changes in its inherent design. It will also be appreciated that the signal is entirely positive in operation, since the medium by which it is operated is the air entrapped within a closed container and this flow may be depended upon since it is utterly impossible to fill the container with liquid without causing the corresponding discharge of air, so that the operation of the signal device is entirely independent of the pressure at which the fuel is admitted to the nozzle. The rate of flow of the fuel may also vary within wide limits without affecting the efficiency of the device, since with the whistle constructed as illustrated in the drawing a comparatively small rate of flow will emit a distinctly audible signal and the flow may be greatly increased without materially affecting the operation of the device except to intensify the whistling sound.

I have shown and described the present invention in the preferred form as developed for military purposes. I am, however, aware that it is subject to numerous alterations and modifications without departing from the spirit of the invention and I therefore do not wish to be limited except as by the scope of the appended claim.

Having thus described my invention, what is claimed as new and desired to secure by Letters Patent is:

In a signal structure, a whistle including a whistle chamber, a central inlet passage in axial alignment with the whistle chamber to deliver an axial jet of air into said chamber, a central outlet passageway in axial alignment with said inlet passage, and an auxiliary inlet passageway entering said chamber and laterally offset from and substantially parallel with the aforesaid central passageways, said auxiliary passageway adapted to be closed at times to permit whistling, and to be opened at other times to provide a non-axial flow of a portion of the air through said chamber to prevent whistling.

LOWELL F. HAMMAND.